(12) United States Patent
Smyth

(10) Patent No.: US 7,275,934 B2
(45) Date of Patent: Oct. 2, 2007

(54) MAGNETIC APPARATUS FOR DEMONSTRATION OF BINARY NUMBERS

(76) Inventor: Robert William Smyth, 57 Cedar Grove Rd., Toms River, NJ (US) 08753

( * ) Notice: Subject to any disclaimer, the term of this patent is extended or adjusted under 35 U.S.C. 154(b) by 392 days.

(21) Appl. No.: 10/779,188

(22) Filed: Feb. 14, 2004

(65) Prior Publication Data

US 2005/0277095 A1 Dec. 15, 2005

(51) Int. Cl.
*G09B 19/02* (2006.01)
(52) U.S. Cl. ............... 434/189; 434/188; 434/365; 446/129
(58) Field of Classification Search ............ 434/365, 434/189, 190; 446/129, 132–138
See application file for complete search history.

(56) References Cited

U.S. PATENT DOCUMENTS

| | | | | |
|---|---|---|---|---|
| 4,132,015 A | * | 1/1979 | Machen | 434/118 |
| 4,295,832 A | * | 10/1981 | Karell | 434/168 |
| 4,658,928 A | * | 4/1987 | Seo | 180/168 |
| 5,701,113 A | * | 12/1997 | Edberg | 335/285 |
| 6,053,622 A | * | 4/2000 | Horowitz et al. | 362/129 |
| 2003/0027483 A1 | * | 2/2003 | Rosenberg | 446/129 |
| 2004/0181671 A1 | * | 9/2004 | Brundage et al. | 713/176 |

FOREIGN PATENT DOCUMENTS

JP 03292977 A * 12/1991

* cited by examiner

*Primary Examiner*—Ronald Laneau
*Assistant Examiner*—Nikolai A Gishnock
(74) *Attorney, Agent, or Firm*—Jacobs & Kim LLP; Daniel Kim, Esq.

(57) ABSTRACT

An apparatus and method for motivating students in mathematics education, computer technology education and information encoding. The apparatus consists of a container holding multi-state sources and a reading device, if necessary, that can determine the state of the sources in the container when it is closed. Students determine the states of the sources and use a predetermined algorithm to determine the information or data represented in the container. The apparatus and method can be presented to an audience as a magic trick.

5 Claims, 1 Drawing Sheet

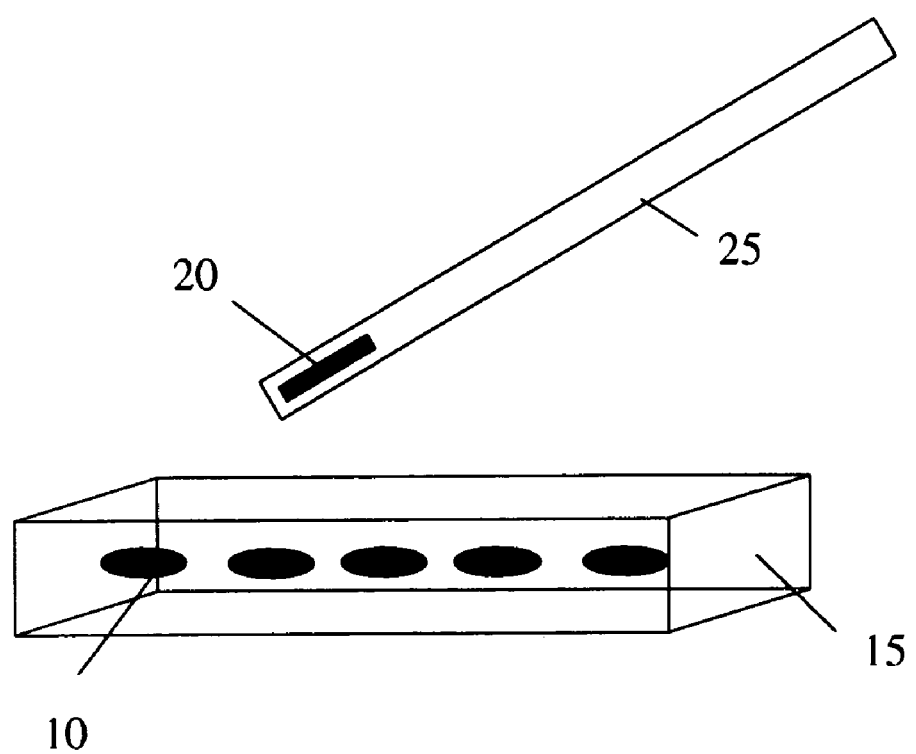

MAGNETIC APPARATUS FOR DEMONSTRATION OF BINARY NUMBERS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

This invention relates to the fields of mathematics education and computer technology education. In particular, this invention includes an apparatus and method for motivating students to learn about numeration systems, including binary numbers, and information encoding. It allows students to encode and decode information and motivates them to learn the conversion algorithms by providing a fun way for them to demonstrate their knowledge.

Various devices have been designed to aid students in learning about binary numbers and their manipulation and to introduce computer concepts. U.S. Pat. No. 4,132,015 issued to Lonnie Machen on Jan. 2, 1979 describes a board with columns that aids in teaching numeration systems and computer concepts. U.S. Pat. No. 4,772,208 issued to Athanasios Tsokas on Sep. 20, 1988 describes a display surface with zones for demonstration of math concepts. U.S. Pat. No. 5,213,506 issued to Paul M. Lapsa et al. on May 25, 1993 describes a binary computer as an educational device.

Although there are various apparatus available to aid in teaching binary numbers, the present invention motivates students to learn by allowing the students to demonstrate their understanding of concepts in a fun and educational way. The present invention allows students to work in teams encoding and decoding information. The invention could be used as an educational magic trick performed for an audience.

BRIEF SUMMARY OF THE INVENTION

This invention is an apparatus and method for use in teaching mathematics and information encoding and introducing elementary concepts of computer technology. The invention has the object of providing an apparatus and method which assists educators in teaching and motivating students. Students demonstrate their knowledge in a fun way rather than just perform calculations or conversions.

The invention provides an apparatus comprising a container which holds several multi-state sources and an independent reading device to be used to ascertain the current state of each of the sources in the container. The contents of the container can be manipulated to adjust the sources to a set of desired states encoding some piece of information according to a predetermined coding scheme. The reading device may be used to determine the states of the sources in the container without opening the container. The information obtained with the reading device together with the knowledge of the coding scheme may be used to determine "the message" in the container without opening the container. The invention can motivate students by having them encode and decode information as a magic trick. The invention uses low cost materials and is easy to use.

BRIEF DESCRIPTION OF THE DRAWING

FIG. 1 is an overview of an apparatus in accordance with the present invention.

DETAILED DESCRIPTION OF THE INVENTION

Apparatus

The drawing illustrates a possible configuration of the essential apparatus in one embodiment of the invention. The apparatus consists of:

- a container 15 with a collection of multi-state sources 10 inside and
- a reading device 25 with a component 20 to respond to the current state of the sources.

The multi-state sources 10 may be energy beams or fields which emanate from their fixed locations or the sources of any physical effect that can be detected from outside of a container 15. Each source 10 would need to be read distinctly and independently. The container 15 is to be such that it can be manipulated to adjust the sources 10 to a set of desired states encoding some piece of information according to a predetermined coding scheme. The reading device 25 is to be able to allow a person to ascertain the state of each of the sources 10 without opening the container 15. The size, number and position of the sources 10 is not fixed and can be adjusted to a desired application. The information obtained with the reading device 25 with the appropriate component 20 about the sources 10 together with the knowledge of a coding scheme may be used to determine "the message" in the container 15 without opening the container 15. If the sources 10 and container 15 were manufactured so that human senses could ascertain the states of the sources 10 in the container 15 without opening the container then a reading device 25 may not be necessary in that particular application.

In one embodiment, this invention can introduce binary numbers. In this embodiment, magnets could be used as the multi-state sources 10 where the orientation of the magnets would provide two distinct states. The reading device 25 would contain another magnet embedded in a cavity at the tip of the device which would be the component 20 to ascertain the orientation of the magnets in the container or box 15. The box magnets 10 can be marked with "0" at the north pole and "1" at the south pole and the reading device magnet 20 can have the south pole of a magnet at the tip. The source magnets 10 could be arranged in separate compartments in the box 15. In the method for this embodiment, attraction of the-tip of the reading device 25 to a position at the top of the closed box 15 directly above a magnet 10 compartment would represent a "0" and repulsion from such a position would represent a "1". In this embodiment, a person can arrange the magnets 10 in the box 15 so that the markings on the magnets 10 coincide with a desired binary number as designated by the "0" and "1" labels. Another person, a reader, knowing the attraction and repulsion convention but not the specific number that is currently encoded in the box 15, uses the reading device 25 containing a magnet 20 and waves it carefully over the box 15 noting if there is repulsion or attraction above each source location. Based on the previously agreed upon convention, the reader can determine what number was "written" in the box 15. The reader can determine the binary number that is in the box 15 and then can present it as a base ten number if desired.

The above embodiment of the invention can be used to perform a wizard's trick for an audience. The audience could tell the wizard's assistant the "secret" base ten number, without the wizard hearing what the number is. The assistant would adjust the sources in a container or box to represent the "secret" number in binary form. The wizard would then step in and determine the hidden number by reading the binary number in the box without ever opening the box. In this embodiment, the wizard needs to understand binary numbers and be able to interpret the states of the sources in order to process the information and determine the "secret" number. Thus the desire to perform the magic trick could be used to motivate students to learn about binary numbers. Furthermore, the similarity between the manner of information coding in this trick and information storage in mass storage devices for computers could be used as the foundation for a basic and interesting introduction to some elementary concepts in digital electronics and computing technology.

In another embodiment of the invention, the multi-state sources can be heating elements in compartments of a box which are thermally isolated from each other. The heating elements should have individual on/off switches. The state of each source (whether it is turned on or off) can be determined by touch at appropriate locations on the outside of the box while the box is closed.

I claim:

1. An educational apparatus, comprising:
    a container including a set of defined locations into which a corresponding set of magnets is removably mounted, the mounted set of magnets being arranged side by side in an array underneath a covering surface of the container, each individual mounted magnet representing an individual bit of a binary representation of a number the respresented bits being visually indiscernible through the container covering surface,
    each individual magnet being removably into the array in one of two distinct orientations, a binary "0" orientation, in which a first magnetic pole faces towards the container covering surface and a second, opposite magnetic pole faces towards the container covering surface, and a binary "1" orientation, in which the second magnetic pole faces towards the container covering surface and the first magnetic pole face towards the container covering surface,
    the mounted set of magnets being positioned with respect to the container covering surface such that the orientation of each individual magnet in the array of magnets is tactilely detectable through the container covering surface as attraction or repulsion between each individual magnet and a handheld magnet traveling over the container covering surface, thereby allowing a holder of the external magnet to ascertain, through tactile sensation alone, the number represented in binary by the arrangement of the set of magnets in the array.

2. The educational apparatus of claim 1, wherein the magnet locations within the container are defined by a set of compartments, each compartment receiving a magnet.

3. The educational apparatus of claim 1, wherein for each magnet in the set of magnets, the first magnetic pole is labeled with the number "0," and wherein the second magnetic pole is labeled with the number "1."

4. The educational apparatus of claim 1, wherein the handheld external magnet is mounted onto an end of a wand.

5. The educational apparatus of claim 1, wherein the container has a rectangular profile with flat outer surfaces.

* * * * *